United States Patent [19]

Amrogowicz

[11] 4,128,354
[45] Dec. 5, 1978

[54] KNOCK-DOWN CONTAINER SIDE PANEL CONNECTIONS

[76] Inventor: Erich Amrogowicz, am Bassberg 8, 8776 Heigenbrucken, Spessart, Fed. Rep. of Germany

[21] Appl. No.: 868,833

[22] Filed: Jan. 12, 1978

[30] Foreign Application Priority Data

Jan. 13, 1977 [DE] Fed. Rep. of Germany ....... 2701158

[51] Int. Cl.$^2$ .............................................. F16B 9/02
[52] U.S. Cl. .................................. 403/186; 220/4 F; 217/43 A; 312/257 SK; 403/353
[58] Field of Search ................. 403/186, 167, 11, 188, 403/14, 246, 353; 220/4 F; 217/43 A; 108/55.1, 56.1; 312/257 SK, 263, 264

[56] References Cited

U.S. PATENT DOCUMENTS

| | | | |
|---|---|---|---|
| 1,177,847 | 4/1916 | Bosworth et al. | 20/4 F |
| 1,617,865 | 2/1927 | Richardson | 5/299 |
| 3,749,465 | 7/1973 | Newcomer | 312/263 X |
| 3,809,278 | 5/1974 | Csumrik | 220/4 F |
| 3,865,250 | 2/1975 | Jay | 403/353 X |

FOREIGN PATENT DOCUMENTS

| | | | |
|---|---|---|---|
| 600831 | 6/1960 | Canada | 217/43 A |
| 1178431 | 5/1959 | France | 217/43 A |
| 910606 | 11/1962 | United Kingdom | 108/56 R |

*Primary Examiner*—Wayne L. Shedd
*Attorney, Agent, or Firm*—Michael J. Striker

[57] ABSTRACT

A connecting arrangement for box-shaped support structures connects the upright walls constituting the support structure to one another at upright marginal portions thereof. The connecting arrangement includes upper and lower connecting projections which are rigid with the marginal portions of one of the walls, and upper and lower slots which are provided in the marginal portions of another wall constituting the support structure. Each of the upper slots has an L-shaped configuration, commences at the upper end face of the marginal portion and extends first downwardly therefrom and then toward the side face of the marginal portion. Each of the lower slots has a substantially inverted V-shaped configuration and extends inwardly from the above-mentioned side face of the marginal portion, first upwardly and then downwardly. The respective end zones of the slots are vertically aligned with one another and receive the connecting projections of the first-mentioned marginal portion. The lower slot further includes an elongated extension which commences at the end zone of the lower slot and extends therefrom vertically upwardly. The distance between the end zones of the slots, on the one hand, and between the end zone of the upper slot and the open end of the lower slot, on the other hand, corresponds to the distance between the connecting projections. As a result of the configurations of the slots, the connecting projections are securely retained therein regardless of the subsequent orientation of the support structure.

18 Claims, 6 Drawing Figures

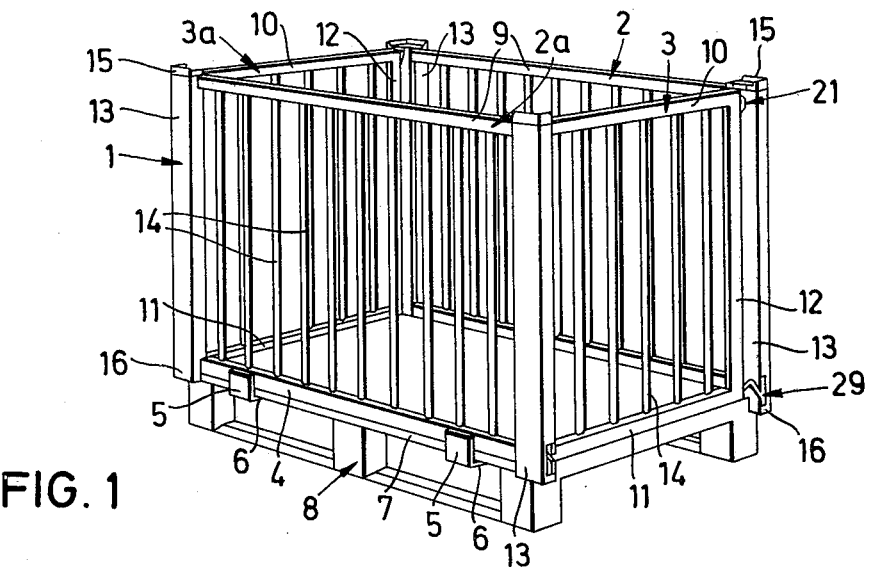
FIG. 1
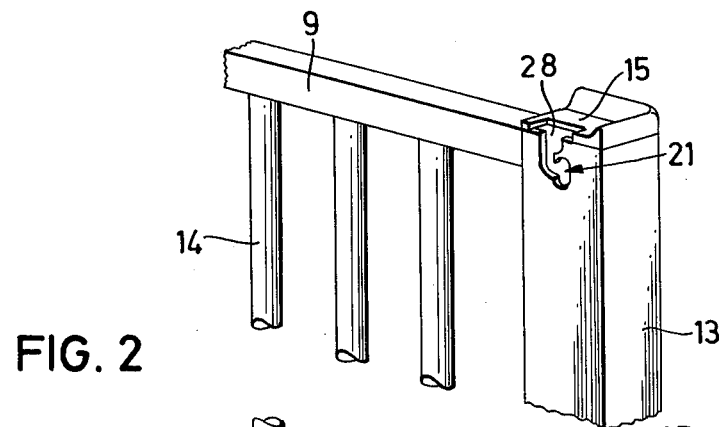
FIG. 2
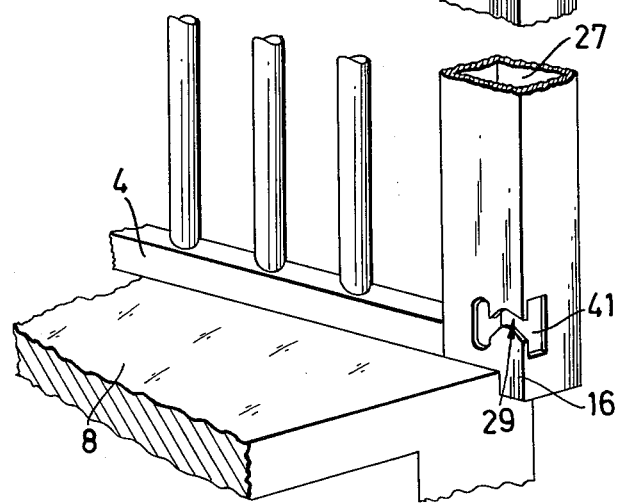

KNOCK-DOWN CONTAINER SIDE PANEL CONNECTIONS

BACKGROUND OF THE INVENTION

The present invention relates to connecting arrangements in general, and more particularly to an arrangement for interconnecting the adjacent upright marginal portions of wall components to form unitary box-shaped support structures or containers.

There have already been proposed various structures, which will hereafter be referred to as a support structure regardless of whether they are frameworks, containers, supports or otherwise, which, for the sake of a rapid assembly and partial or complete disassembly, are equipped with connecting arrangements which connect the components of the support structure to one another. More particularly, there has been already proposed a multitude of constructions in which the components of the support structure are connected to one another by means of connecting projections of some of the components which are received and arrested in position in slots of the remaining components. Thus, for instance, it is already known to provide the connecting slots as well as the connecting projections at the respective upper and lower regions of the components to be connected which assume upright orientations at least during the assembly of the support structure. Then, it is also known to let the upper connecting slots open onto the upper end face of the respective component, and to let the lower connecting slots open onto the respective side face of the respective component as considered in the assembling position of the component. Then, it has also been already proposed to provide means for arresting the lower connecting projections in the lower connecting slots.

The connecting arrangements of this type find a particular utility in such support structures as pallet frames which, among others, serve as supports for flat pallets or as constituent parts of so-called lattic box pallets. The walls or wall components of such a support structure can be constituted by lattice work or a network which is circumferentially reinforced by interconnected horizontal and vertical beams. However, the wall components can also be solid, that is, complete and imperforate so that the assembled support structure will constitute a container. Whether the support structure takes the form of a cage or of a container, it can be used not only for support or storage purposes, but also for transportation, delivery and provisioning.

However, it will be appreciated that the support structures of the above-mentioned type could also be used otherwise. For instance, a support structure of this type could be advantageously used as a super structure of a truck or a trailer.

In support structures of this type, at least one of the wall components of the support structure is dismountably supported on the remainder of the support structure. Particularly in support structures of parallelepiped configurations, however, it is already known to releasably connect the two side walls, on the one hand, and the front and rear walls, on the other hand, to one another. Then, two oppositely arranged ones of the above-mentioned walls are used as primary walls, and the two remaining secondary walls are then releasably mounted on the primary walls and arrested in position relative thereto. The primary walls usually are provided with the above-mentioned slots while the secondary walls usually have the above-mentioned connecting projections.

In one of the conventional support structures of the above-mentioned type, the upper connecting slots are provided in the upright marginal portions of the primary walls and each of them is shaped as a vertical slot which is adjoined by and communicates with a recess, while each of the lower slots is configurated as a horizontal slot which is adjoined by and communicates with another recess. The width of the respective slot, on the one hand, and the dimensions of the recesses, on the other hand, are so selected that the connecting projections which project normal to the respective side faces of the secondary wall components and which have annular collars at the respective free ends thereof can be introduced into the slots where the collars are received in the recesses. The play between the connecting projections and the slots, on the one hand, and between the collars and the recesses, on the other hand, is kept relatively low.

When the connecting projections of the respective secondary wall are introduced into the upper, vertically extending, slots of the neighboring primary walls, these upper connecting projections constitute a pivoting axle for this secondary wall so that the secondary wall can be pivoted thereabout in the downward direction until the lower connecting projections are introduced into the horizontally extending slots of the primary walls. For the purpose of arresting the secondary wall in position, arresting members having respective gripping portions are provided at the additional recesses which are associated with the lower slots, the arresting members being pivotable about the axis of the lower connecting projections in their fully inserted positions. The arresting members are thus capable of fixing the lower connecting projections in their fully introduced positions within the lower slots and in the additional recesses and, consequently, of preventing the upper connecting projections from sliding out of the upper slots of the primary walls.

The above-discussed connecting arrangement for the support structure can be used in a variety of ways. After the arrest of the lower connecting projections in their associated lower slots, the components of the support structure are positively connected to one another so that the shape of the support structure will not change during the subsequent handling of the support structure. The support structure can be, for instance, lifted at each of its constituent walls, without impairing the connection of the walls to one another. In addition thereto, the known connecting arrangement has the advantage that the assembled support structure can be lifted, turned or rotated in any desired manner without fear of disintegration of the support structure. A support structure of this type can also be used for storing and transporting bulk materials. Then, it is possible to discharge the bulk material from the interior of the support structure by tilting the support structure and by releasing the arresting members holding one of the secondary walls in position so that the affected secondary wall can now be pivoted about the upper connecting projections thereof while the first support structure remains otherwise intact. Furthermore, it is possible to fully pivot the secondary wall, subsequent to the discontinuance of the arresting action of the arresting members associated therewith, so that an easy access is obtained into the interior of, for instance, a pallet frame, even when the latter is arranged in a high-shelf storage intermediate other pallet frames. In view of the fact that the upper connecting projections remain connected to the neighboring primary walls of the support structure even under these circumstances, that is, when the respective secondary wall is pivoted about the upper connecting projections, the support structure remains stable.

However, notwithstanding the undoubtedly existing advantages of the above-discussed connecting arrangement and the support structure equipped therewith, experience has shown that it is disadvantageous in some respects and, hence, that it should still be improved so as to avoid such disadvantages. The reasons for this desired improvement are to be found, on the one hand, in the manufacturing considerations and, on the other hand, in the utilization or handling of the connecting arrangement.

The reasons which are in this connection to be found in the manufacturing considerations, include the substantial expense of the conventional connecting arrangement which is, to a great extent, attributable to the manufacture of the pivotable arresting members and their mounting on the primary walls. The limited play which is necessary for the assurance of the proper function of the pivotable arresting members calls for accurate manufacturing procedures and, hence, for the utilization of corresponding precise and, hence, expensive machines and arrangements which can be operated only by correspondingly trained personnel. Another factor which contributes to the rather high expense of the conventional connecting arrangement is to be found in the additional material and labor consumption which goes with the provision of the arresting members of the conventional connecting arrangement.

With respect to the utilization or handling considerations which render the conventional connecting arrangement less than perfect, it is to be mentioned that the mentioned conventional connecting arrangement does not sufficiently take into account the human imperfection. More particularly, lack of experience or of the proper attitude, or shear laziness on the part of the handling personnel, may result in a situation where, when the support structure has a disadvantageous position, such as, for instance, when the access to the arresting members is somewhat difficult, the arresting members, or one of them, are not fully or not at all actuated in their arresting sense. However, it will be appreciated that an improper arresting action of the arresting members cannot assure the integrity of the support structure during the handling thereof.

Furthermore, the movability of the pivotable arresting member may become impaired. The cause of this impairment may be the soiling of the connecting arrangement on or at the arresting members. However, it is also possible that the arresting members will freeze in their positions, for instance, when the support structure is used in cold storage facilities. When this happens, the handling of the affected arresting members will be impossible, at least for a limited period of time. Moreover, it can be imagined that, due to an improper handling of the arresting members and/or to the subjection thereof to improperly oriented or excessive forces, the arresting members will be damaged to such an extent that they will not be capable of moving within the recesses and thus their operation will be discontinued. In addition thereto, experience has shown that the above-mentioned gripping portions of the arresting members, which project beyond the outer contour of the support structure proper, have a detrimental influence during the handling of the support structure. Thus, it is possible not only that clothing articles or overalls of persons handling or passing by the support structure may become caught on the projecting gripping portions of the arresting members, but also that such persons may suffer an injury, particularly when the gripping portions have been so damaged that sharp edges or other sharp projections are present thereon. Finally, the presence of the projecting gripping portions of the arresting members requires the handling personnel to pay close attention to the support structure during the stacking, unstacking and other handling thereof.

SUMMARY OF THE INVENTION

Accordingly, it is a general object of the present invention to avoid the disadvantages of the prior art.

More particularly, it is an object of the present invention to so construct a connecting arrangement of the type here under consideration as not to be possessed of the above-discussed disadvantages.

It is still another object of the present invention to develop a connecting arrangement for support structures which is simple in construction, inexpensive to manufacture, and reliable nevertheless.

A concomitant object of the invention is to design a connecting arrangement which requires lower material and lower expenditures and which has a higher durability, a simplified handling, and a reduced malfunction the conventional connecting arrangements of this type.

A yet another object of the present invention is to provide the connecting arrangement which renders it possible to easily handle the support structure equipped therewith.

In pursuance of these objects and others which will become apparent hereafter, one feature of the present invention resides, in an arrangement for interconnecting components at adjacent upright marginal portions thereof, particularly wall components to form unitary box-shaped support structures therefrom, briefly stated, in a combination which comprises an upper and a lower connecting projection rigid with one of the respective adjacent marginal portions at the upper and lower regions thereof; and means at the upper and lower regions of the other respective adjacent marginal portion for defining an upper and a lower connecting slot for respectively receiving said connecting projections of said one marginal portion, said upper connecting slot having a substantially L-shaped configuration and including a longer leg which opens into and extends downwardly from the upper end face of said other marginal portion and a shorter leg which extends from said longer leg toward the side face of said other marginal portion, and lower connecting slot having a substantially inverted-V-shaped configuration and including a first leg which opens onto and extends inwardly and upwardly from said side face of said other marginal portion and a second leg which extends inwardly and downwardly from said first leg. Each of the connecting projections has an enlarged free end portion which engages behind the other marginal portion about the respective connecting slot. Advantageously, the respective end zones of the shorter leg of the upper slot and of the second leg of the lower slot are located in a substantial vertical alignment with one another. Preferably, the end zones of the shorter and second legs are spaced from one another the same distance as the associated connecting projections of the one marginal portion. It is further advantageous when the open end of the first leg of the lower slot which is located at the side face of the other marginal portion is spaced the above-mentioned distance from the end zone of the shorter leg of the upper slot. Preferably, the vertical dimension of the areas of the other marginal portion which are respectively occupied by the upper and lower slots are approximately the same.

The above-mentioned construction of the upper and lower connecting slots in the marginal portions of the primary wall components of the support structure and their cooperation with the connecting projections of the adjacent marginal portions of the secondary wall components of the support structure, as well as the relative position of the connecting slots with respect to one another and with respect to the upper and lower connecting projections associated therewith, renders it possible to arrestingly connect the primary and secondary wall components to one another without resorting to the use of any movable arresting members and, additionally, assures that the support structure which is equipped with the above-discussed connecting arrangement does not disintegrate even when rotated through the full 360° in any direction. While it is true that the respective secondary or releasable wall component is free to conduct slight movements relative to the adjacent primary wall components, in the course of such tilting or turning movements, for instance, during the handling of the support structure by a forklift truck, for example, for loading, unloading, stacking or unstacking purposes, it will still be impossible for the connecting projection to leave the associated connecting slot and thus to discontinue the arresting cooperation of the connecting slots with the connecting projections.

The connecting projections which, in their usual operating positions, are arranged substantially vertically above one another, are incapable of performing any joint movements within their respective slots which would result in a concurrent movement of the connecting projections out of their arresting positions. Irrespective of the fact to which type of tilting movements the support structure is subjected, at least one of the two connecting projections of the respective marginal portion of the respective secondary wall conducts a first movement which is substantially normal to the direction in which the respective one connecting projection would have to move in order to leave its associated slot and thus discontinue the arresting action thereof. So, for instance, the upper connecting projections must be first moved horizontally toward the center of the respective primary wall, before they can be moved through the longer vertically extending legs of the L-shaped connecting slot in the upward direction. A similar situation is also present with respect to the lower connecting projections which are received in the inverted-V-shaped connecting slots. Thus, as a result of the configuration and arrangement of the upper and lower connecting slots, the connecting projections conduct, during all possible tilting movement of the support structure, movements within their associated connecting slots which are attributable to the weight of the secondary wall, but cannot, under any circumstances, leave the associated connecting slots solely as the result of the tilting of the support structure.

When the connecting arrangement of the present invention is compared with that which has been discussed above, it will become apparent that the connecting arrangement of the present invention dispenses with the expensive operations which have heretofore been needed for manufacturing the arresting elements and the mounting arrangements therefor, the previously needed machinery and devices, and the heretofore present material consumption. All that is necessary in accordance with the present invention is to manufacture the two positively defined connecting slots and the associated recesses, which task can be accomplished without any difficulty by resorting to the use of readily available machine tools or even in a molding operation.

In a currently preferred embodiment of the present invention, the vertical dimension of the area which is occupied by the lower slot exceeds the vertical dimension of the area occupied by the upper slot by at most one-half of the diameter of the respective connecting projections. As a consequence thereof the lower connecting projections can traverse a stroke within the inverted-V-shaped connecting slots associated therewith which is longer by one-half of the diameter of the connecting projection than the possible stroke of the upper connecting projections within the vertical legs of the upper connecting slots, while the upper connecting projections are still prevented from fully leaving the upper connecting slots.

A proper arresting action of the connecting arrangement will be assured even under extraordinary, that is unusual handling situations, for instance, during a multiple to-and-fro tilting of the support structure through a substantial angle, by providing an elongated extension slot which extends upwardly from the end zone of the second leg of the lower slot and has a length which is substantially equal to that of the longer leg of the upper slot. As a result of the provision of the extension slot, there are formed, at the lateral surfaces bounding the extension slot which are closer to the above-mentioned side face of the marginal portion, abutment noses which prevent an unintentional sliding of the lower connecting projections into the second leg of the inverted-V-shaped lower connecting slots.

In order to avoid the possibility that the lower connecting projections could slide from their arresting positions into the second legs of the inverted-V-shaped lower connecting slots even when the respective secondary wall is subjected to substantial horizontal forces from the interior of the support structure, the present invention further proposes that the first and second surfaces which respectively bound the first and second legs of the lower slot from below be substantially straight and enclose an angle of substantially 90° with one another. Furthermore, it is proposed that the surface which bounds the first and second legs of the lower slot from above have an arcuate configuration. The first surface which bounds the first leg of the inverted-V-shaped slot makes it necessary during the arresting of the secondary wall with the adjacent primary walls to first move the lower connecting projections to a certain extent in the upward direction in the lower connecting slots, subsequent to the introduction of the upper connecting projections in the upper L-shaped connecting slots of the adjacent primary walls so that the lower connecting projections can slide along the first surfaces of the respective lower inverted-V-shaped connecting slots in the inward and upward direction. Only after the lower connecting projections have been moved all the way through the first leg of the lower connecting slot while being received between the first surface and the curved surface which together bound the first leg of the lower connecting slot, can the lower connecting projections slide inwardly and downwardly along the second surfaces which bound the second leg of the inverted-V- shaped lower connecting slot from below into their operative position, that is, into the end zones of the lower connecting slots. However, the second surfaces which bound the second legs of the lower connecting slots from below also assure that a sliding of the lower connecting projections out of the end zones of the inverted-V-shaped lower connecting slot is possible only by applying a force acting on the respective secondary wall opposite to the force of gravity.

In a particularly advantageous embodiment of the present invention, the shorter leg of the upper slot extends beyond the longer leg of the upper slot to a distance which equals at least one-half of the diameter of the respective upper connecting projection. However, it is even more advantageous when the distance by which the shorter leg of the upper slot extends beyond the longer leg of the upper slot substantially equals the above-mentione diameter.

A further advantageous aspect of the present invention resides in the fact that an upper and a lower depression is provided at the end zone of the shorter leg of the upper slot which receives the upper connecting projection in the assembled condition of the support structure. When the connecting arrangement is constructed in this manner, it assures the proper arresting action of the upper connecting slot even when the support structure is subjected to vibrations or oscillations acting in all possible directions, and in all possible positions of the support structure. It is particularly advantageous when the depth of each of the depressions approximately equals one-fourth of the diameter of the upper connecting projection. This embodiment of the present invention offers an effective resistance to an unintentional displacement of the upper connecting projections out of their operating positions even when the above-mentioned vibratory and oscillatory influences become combined with the action of the contents of the support structure on the respective secondary walls. A further advantage of this construction is that the upper connecting projections positively assume an operative position in their associated upper connecting slots of the adjacent primary walls even when the releasable secondary walls are pivoted about the upper connecting projections through approximately 270° out of the closing position of the affected secondary wall and when the originally lower connecting projections come to rest on the upper longitudinal edges of the adjacent primary wall component. Even under these circumstances, the originally upper connecting projections must be, when it is desired to dissociate the respective secondary wall component from the adjacent primary wall components, moved vertically out of the respective depressions, before the upper connecting projections are free to be displaced into the vertically extending longer legs of the L-shaped upper connecting slots and before they can be moved upwardly through the latter and out of the same. In addition thereto, it is possible to lift the support structure by engaging the upper horizontal beam of the secondary wall component which is rotated through the 270°, inasmuch as the upper connecting projections are securely retained in the upper depressions of the end zones of the shorter legs of the L-shaped upper connecting slots even under these circumstances.

The above-mentioned properties of the connecting arrangement of the present invention are further improved, according to a further facet of the present invention, in that a further depression is provided which commences at the upper end face of the other marginal portion and extends a limited distance along the longer leg of the upper slot.

Within the context of the present invention, it is further advantageous when the upper and lower connecting slots are provided in brackets which are rigid with the respective primary wall components and constitute the corner portions thereof. The connecting slots can then be provided in the brackets by resorting to milling, punching or other material-removing operations, or by molding the brackets with the respective connecting slots. The same is also valid for the recesses which are associated with the slots and which accommodate the annular free end portions of the connecting projections. The brackets themselves can be formed as discrete structural elements and then connected to the horizontal or vertical beams of the frame of the primary wall components by welding or by any other conventional kind of connection.

A further advantageous embodiment of the present invention proposes that the upper and lower connecting slots be provided in rectangular hollow elements which constitute the marginal portions of the primary wall components. Such rectangular hollow elements then constitute, for instance, the vertically extending end beams of the frame of the respective primary wall component. The transverse dimensions of these hollow elements can be so selected that they have a smooth outer contour devoid of any projections and that they immediately merge at their upper and lower sides into male and female connectors which serve to define the position, for instance, of a support structure which constitutes a pallet frame on a pallet.

It is further advantageous when, according to a further aspect of the present invention, the lower and upper connecting slots are provided in connecting plates which, in turn, are rigidly connected to U-shaped beams, the connecting plates and the U-shaped beams together constituting the marginal portions. Then, the connecting slots are either punched or milled into the connecting plates, and subsequently the connecting plates are connected to the ends of the arms of the U-shaped beams at the upper and lower end regions of such beams. This embodiment of the present invention renders it possible to make the connecting slots without considering whether the connecting plates will eventually be used on the right or on the left side of the support structure. The proper orientation of the connecting plates has to be considered only during the connecting thereof to the profiled beams.

Regardless of the fact whether the connecting slots are provided in hollow structural elements or in connecting plates, which are then rigidly connected to the above-mentioned U-shaped beams, another advantage which is obtained by constructing the marginal portions of the primary wall components in this manner is that the support structure constructed in this way is much easier to clean than the support structures of the prior art. So, for instance, the cleaning operation can now be accomplished in a very simple manner by resorting to the use of a hose by means of which a cleaning medium, such as water, can be injected and aimed at all regions of the hollow elements or of the U-shaped beams. In the heretofore known solution, the edges and projections or recesses of the connecting arrangement and particularly of the arresting members prevent the water or cleaning fluid jets from reaching all parts of the beams. This is particularly disadvantageous when the support structure is to be used in the food or beverage manufacturing branch of the industry where the standards of cleanliness are very high for hygienic reasons.

Because of the smooth outer contours of the vertical beams which are constituted by the hollow elements or by the U-shaped elements, the heretofore necessary projecting regions of the male and female connectors in the support structures constituted by pallet frames are no longer needed, which is a pronounced advantage in that the projection portions had a very disturbing influence. The smooth outer contour of the beams which is devoid of any projections now avoids the possibility that the adjacent or superimposed pallet frames could become engaged with one another or slide into each other. Thus, the novel support structure can now be stored in a close proximity to one another without exercising an extraordinary degree of care. Also, the stacking and unstacking of the support structures, for instance, on shelves or on the floor, is significantly enhanced by the smooth outer contour of the support structure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a pallet frame of the present invention which is constituted by a plurality of wall components which are connecting to each other by the connecting arrangement of the present invention and which are supported on a pallet;

FIG. 2 is an enlarged perspective view of an upper and a lower corner region of a longitudinal wall of the support structure of FIG. 1;

DETAILED DISCUSSION OF THE PREFERRED EMBODIMENTS

Figure 3:
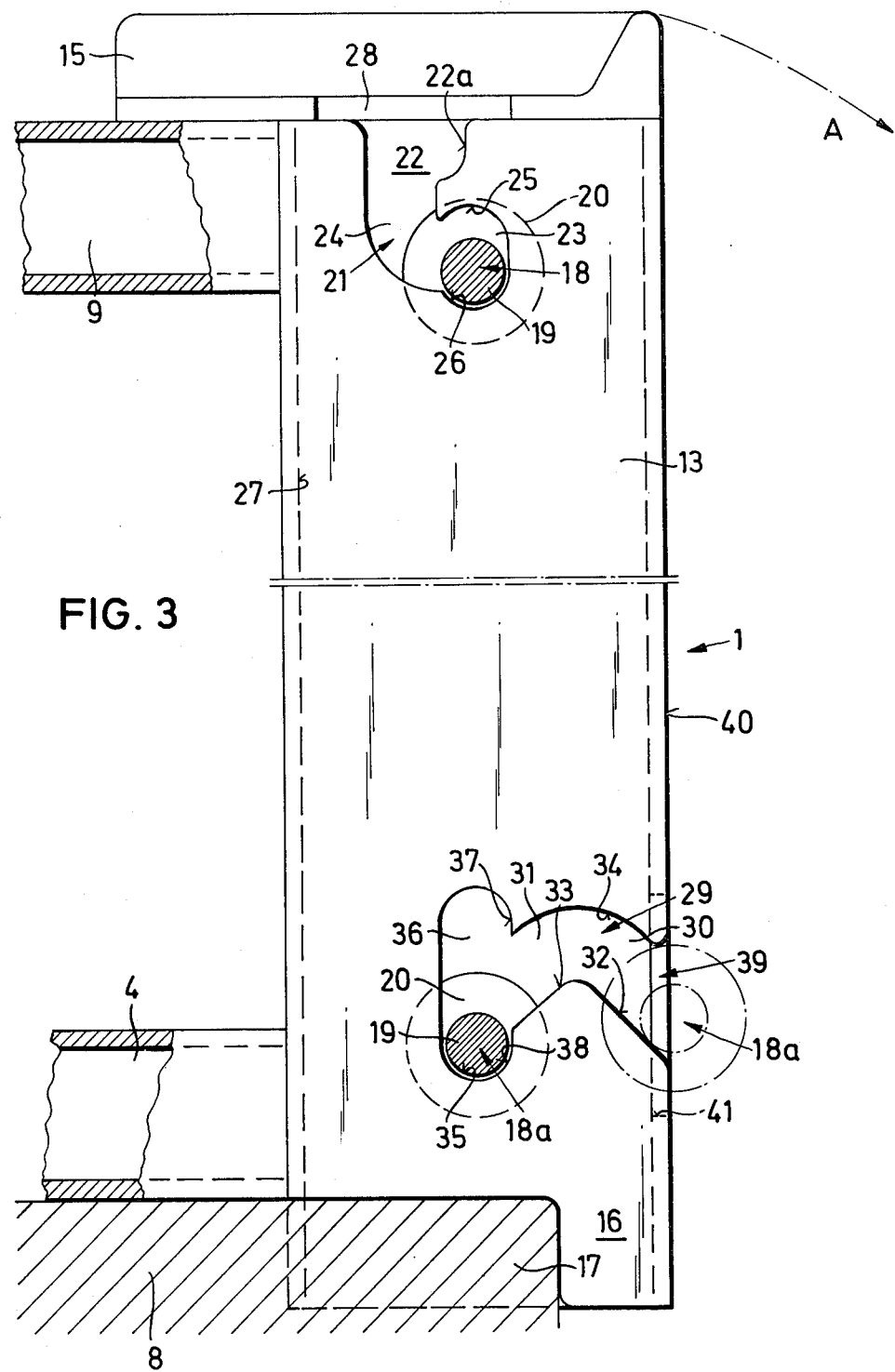
FIG. 3 is even more enlarged, partially sectioned, view of the upper and lower corner region of the longitudinal wall according to FIG. 2.

Referring now to the drawing in detail, and first to FIG. 1 thereof it may be seen therein that the reference numeral 1 has been used to designate the support structure of the present invention in toto. The support structure 1 is illustrated as a pallet frame which includes two primary or longitudinal wall components 2, 2a and two secondary or end walls 3, 3a. Each of the wall components 2, 2a, 3, 3a consist of a plurality of spacedly arranged vertical beams as well as of upper and lower horizontal beams which will be referred to in more detail whenever necessary as the present discussion proceeds. In this connection, it is to be mentioned, that whenever reference is being had to any directions or positions, such as upper, lower, side, longitudinal, transverse or the like, it refers to the position illustrated in FIG. 1. Of course, as will become apparent hereafter, the support structure 1 could and in many instances will be tilted so that, for instance, the originally upper parts will become the lower parts. However, to facilitate the understanding of the present invention, these parts will still retain their original designation regardless of the actual position assumed thereby. In addition thereto, it will be appreciated that, while the support structure of the present invention has been illustrated as including two longer longitudinally extending primary wall components, and two shorter transversely extending secondary wall components, the primary and secondary wall components could also have the same dimensions or the situation could be reversed, that is, the secondary wall components could be longer than the primary wall components.

The primary wall components 2, 2a have respective lower beams 4 which are equipped with longitudinally spaced angular pieces 5. Each angular piece 5 has a horizontal arm 6 which is spaced such a distance from the lower beam 4 that the respective primary wall 2, 2a can be shifted in an upright position thereof onto a support plate 7 of a pallet 8, while a portion of the support plate 7 is received, with a limited play, between the lower beam and the horizontal arm 6.

As will become apparent from the joint consideration of FIGS. 1 to 3, all horizontal beams 4, 9, 10 and 11 of the primary and secondary wall components 2, 2a, 3, 3a, as well as vertical end beams 12 of the secondary wall components 3, 3a are configurated as hollow elements of a rectangular cross-section while all other vertical beams of the wall elements 2, 2a, 3, 3a, except for vertical end beams 13 of the primary wall components 2, 2a, are constituted by round hollow rods 14. The vertical end beams 13 of the primary wall components 2, 2a are constituted by rectangular hollow beams the cross-section of which is larger than that of the horizontal and vertical beams 4, 9, 10, and 11 of the wall components 2, 2a, 3, 3a. At their upper ends, the end beams 13 of the primary wall components 2, 2a are provided with receiving plates 15 which constitute female connectors which serve the purpose of positioning a further, non-illustrated pallet frame 1 which is identical with and superimposed onto the illustrated pallet frame 1. The vertical beams 13 are provided at their lower end regions 16 with inwardly oriented rectangular recesses so that they positively embrace edges 17 of the pallet 8.

Bolts or connecting projections 18, 18a, 18b, 18c are connected to the side faces of the vertical beams 12 of the secondary wall components 3, 3a, being arranged respectively at the upper and the lower end region of the respective vertical beam 12 and extending substantially normal to the respective side face toward the primary wall components 2, 2a. The connecting projections 18, 18a, 18b, 18c have respective enlarged cylindrical free end portions 19 which is illustrated in dashed lines in FIG. 3 and each of which has a circumferential surface 20 which is located at a larger diameter than the periphery of the remainder of the respective connecting projection 18, 18a, 18b or 18c. The length of the cylindrical section of the respective connecting projection 18, 18a, 18b and 18c between the above-mentioned side face of the respective vertical beam 12 and the enlarged end portion 19 is somewhat greater than the wall thickness of the vertical beam 13 of the primary wall components 2, 2a.

O-shaped connecting slots 21 are provided in the upper end regions of the vertical beams 13 of the primary wall components 2, 2a, which are arranged approximately at the elevation of the upper horizontal beams 9. As particularly seen in FIG. 3, each of the upper connecting slots 21 consists of a longer vertically extending leg 22 which has a lateral depression 22a, and a horizontal leg 23 which is shorter than the vertical leg 22 and extends substantially normal to the latter toward an outer side face 40 of the vertical beam 13. The legs 22 and 23 merge with one another at a curved transmission region 24. The shorter horizontally extending leg 23 is adjoined by respective upper and lower depressions 25 and 26, respectively, the depth of which corresponds approximately to a fourth of the diameter of the respective bolt 18 or 18c. The length of the shorter leg 23 corresponds approximately to the diameter of the connecting projection 18, 18a. The lateral surfaces which bound the longer vertical leg 22 or the depression 22a thereof are rounded to gradually merge into the upper end face of the respective vertical beam 13.

The width of the respective L-shaped connecting slot 21 is only somewhat larger than the diameter of the respective connecting projection 18, 18c. In this manner, the enlarged end portions 19 of the connecting projections 18, 18c securely arrest the connecting projections 18, 18c to the vertical beams 13 against movement longitudinally of the connecting projections 18, 18c in that the enlarged end portions 19 are received in the interior of the hollow vertical beams 13. In order to be able to introduce the enlarged end portions 19 into the interior of the vertical beams 13, rectangular cutouts 28 are provided in the respective connectors 15.

Substantially inverted V-shaped lower connecting slots 29 are provided at the lower end regions of the vertical beams 13 of the primary wall components 2, 2a. Each of the lower connecting slots 29 includes a first leg 30 and a second leg 31 each of which extends at an angle to the horizontal. The first leg 30 opens onto the side face 40 of the vertical beam 13. The first and second legs 31 and 32 of the lower connecting slot 29 are bounded from below by respective first and second surfaces 32, 33 which are both substantially straight and which enclose an angle of approximately 90° with one another. The lower connecting slot 29 is bounded from above by an arcuate surface 34. The second leg 31 of the connecting slot 29 has an end zone 35 which communicates with a vertically oriented extension slot 36. The length of this vertical extension slot 36 substantially corresponds to the full height of the respective L-shaped connecting slot 21 provided in the upper region of the respective vertical beam 13. The vertical extension slot 36 is bounded by surfaces 37 and 38 which constitute abutments for the respective connecting projections 18a, 18b. As can be particularly ascertained from FIG. 3, the depressions 25, 26 at the end zone of the shorter leg 23 of the upper connecting slot 21 are located in a substantial vertical alignment with the end zone 35 of the lower connecting slot 29. It may further be seen, that in the illustrated operating position of FIG. 3, the distance of the depressions 26 of the L-shaped upper connecting slots 21 from the end zone 35 of the inverted V-shaped lower connecting slot 29 approximately equals the distance between the bolts 18 and 18a. In addition thereto, it may be recognized that the distance of the open end 39 of the respective inverted V-shaped lower connecting slot 29 at the side face 40 of the vertical beam 13 from the end zone 23, 25, 26 of the L-shaped upper connecting slot 21 is also approximately equal to the distance between the bolts 18, 18a.

In order to be able to introduce even the enlarged end portions 19 of the lower connecting portions 18a, 18b into the interior of the vertical beams 13, that is, into the chamber 27 of the respective vertical beams 13, rectangular cutouts 41 are provided at the side faces 40 of the vertical beams 13, the dimensions of the cutouts 41 being somewhat greater than the corresponding dimensions of the enlarged circular end portions 19 of the connecting projections 18a, 18b.

Having so discussed the construction of the pallet frame 1 which is equipped with the connecting arrangement of the present invention, the assembly of the wall components 2, 2a, 3, 3a into the unitary structure 1 of FIG. 1 will now be discussed. First of all the two primary walls 2, 2a are shifted onto the pallet 8 under the utilization of the angular pieces 5. Inasmuch as the angular pieces 5, as discussed previously, embrace the support plate 7 of the pallet 8 together with the lower horizontal beams 4, with only a minimum play, the primary wall components 2, 2a are maintained in their illustrated upper positions without resorting to any additional measures.

Subsequently thereto, the upper connecting projections or bolts 18, 18c of the secondary wall and wall components 3, 3a are introduced into the upper connecting slots 21 while, simultaneously, the enlarged end portions 19 thereof are introduced into the interiors 27 of the vertical beams 13 of the adjacent primary wall components 2, 2a, until the connecting projections 18, 18c assume approximately that position which is illustrated in FIG. 3. Under these circumstances, the connecting projections 18, 18c are arrestingly received in the lower depressions 26 of the shorter horizontal legs 23 of the slots 21. Now, the secondary wall components 3, 3a can be pivoted in the downward direction in that they are received, with a relatively small play, between the vertical beams 13 of the primary wall components 2, 2a. When they reached their lowermost position, the lower connecting projections 18, 18b rests against the first surfaces 32 of the inverted V-shaped connecting slots 29. This situation is illustrated in dash-dotted lines in FIG. 3. In order to be able to subsequently transfer the connecting projections 18a, 18b into the end zones 35 of the inverted V-shaped lower connecting slots 29, it is initially necessary to once more lift the secondary walls 3, 3a and to transfer the upper connecting projections 18, 18c from the position thereof illustrated in FIG. 3 into the longer vertical legs 22 of the L-shaped upper connecting slots 21. In the course of this movement, the lower connecting projections 18a, 18b slide over the differently inclined surfaces 32, 33 until they are received, as illustrated in FIG. 3, in the end zones 35 of the lower connecting slots 29. During this movement, the upper connecting projections 18, 18c have reassumed their position in the depressions 26 of the shorter legs 23 of the upper connecting slots 21, that is they have assumed the position which is illustrated in FIG. 3. Now, the secondary wall components 3, 3a of the support structure 1 are arrestingly and positively connected with the adjoining primary wall components 2, 2a of the support structure 1.

A discontinuance of the arresting action of the slots 21 and 29, that is, a removal of the connecting projections 18, 18a, 18b and 18c from the positions illustrated in FIG. 3, can only be achieved in that the secondary wall components 3, 3a are lifted against the influence of the gravitational forces thereon, and after a subsequent shifting of the upper connecting projections 18, 18c out of the shorter legs 23 and into the vertical longer legs 22 of the connecting slots 21. Now, when the secondary walls 3, 3a are lifted to such an extent that the lower connecting projections 18a, 18b can be introduced into the second legs 31 of the lower connecting slots 29 the lower regions of the secondary wall components 3, 3a can be tilted outwardly of the support structure 1, while the lifting of the secondary wall components 3, 3a is being continued. In the course of this tilting, the lower connecting projections 18a, 18b slide along the second and first surfaces 33, 32 of the inverted V-shaped lower connecting slots 29. Now, when the lower connecting projections 18a, 18b have reassumed the position which is illustrated in FIG. 3 in dash-dotted lines, the integrity of the support structure 1 is not yet affected to any significant degree in that the upper connecting projections 18, 18c are still received in the depressions 26 of the respective L-shaped upper connecting slots 21. As a result of this, it is possible to pivot the secondary wall component 3, 3a through an angle of approximately 270° upwardly about the connecting projections 18, 18c so that the originally lower connecting projections 18a, 18b come to rest on the upper faces of the upper beams 9 of the primary wall components 2, 2a. When this happens, the interior of the support structure 1 is fairly accessible through the now open end thereof.

Figure 4:
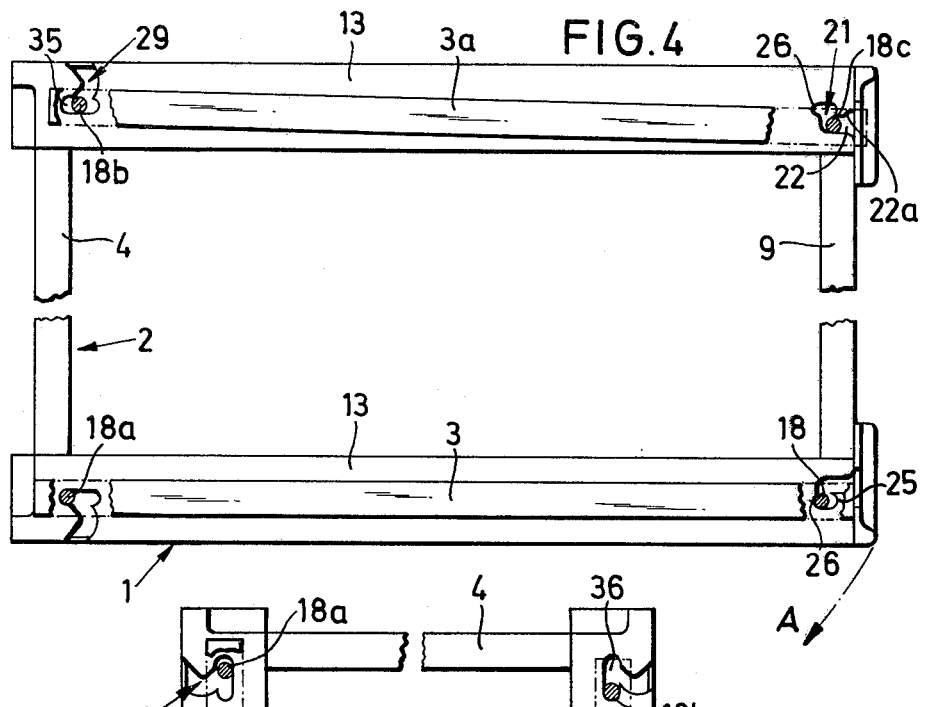
FIGS. 4–6 are somewhat diagrammatic views of the support structure of FIG. 1 in three different positions in which the support structure is rotated 90° along a vertical central longitudinal plane of the support structure.
Figure 5:
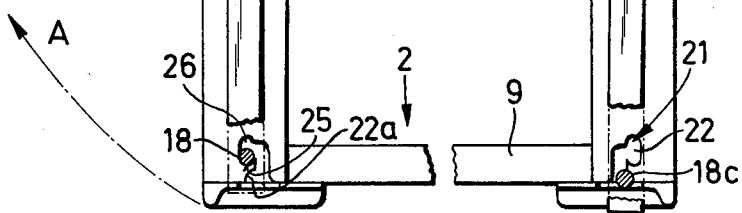
Figure 6:
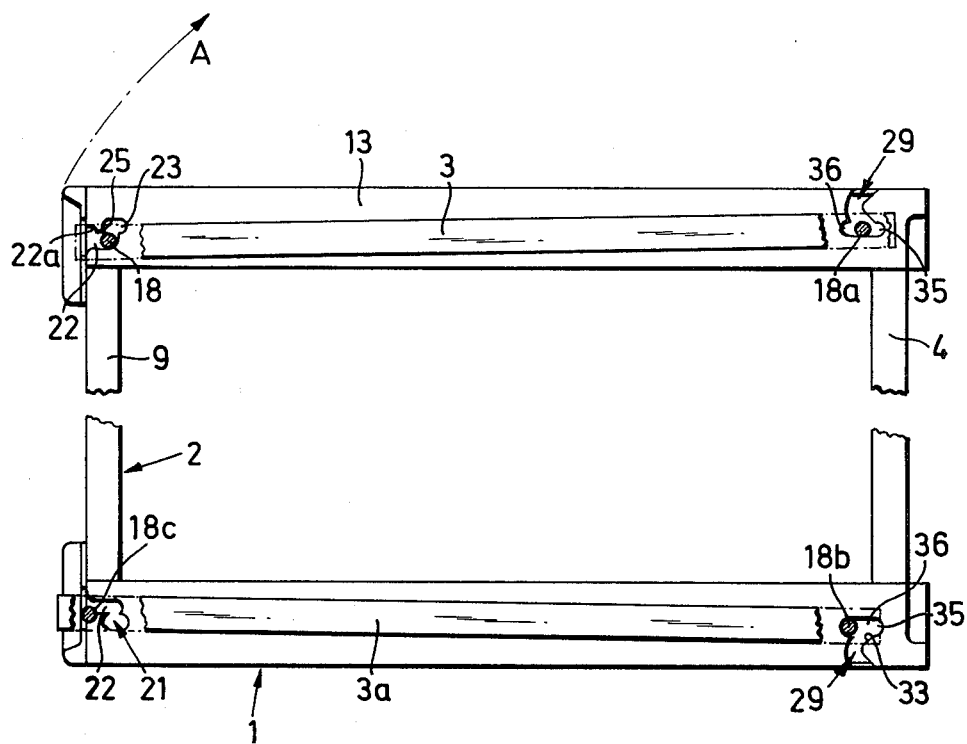

Referring now also to FIGS. 4 to 6, it may be seen that when the support structure 1 is tilted through 90° in the direction of an arrow A of FIG. 3, along its vertical central longitudinal plane, into the position of FIG. 4, the connecting projections 18, 18a of the secondary wall component 3 are not subjected to any forces which would move them out of the operating position illustrated in FIG. 3. In this connection, it is to be mentioned that FIG. 2, as well as the subsequently described FIGS. 5 and 6, illustrate the two end portions of the primary wall component 2 and the secondary wall components 3, 3a, together with the connecting projections 18, 18a, 18b, 18c connected thereto in a somewhat diagrammatic fashion. In the position of FIG. 4, the weight of the secondary wall component 3 holds the same in a position in which the connecting projections 18, 18a in their original positions corresponding to those assumed in FIG. 3. On the other hand, the connecting projection 18c of the secondary wall component 3 slides out of the depression 26 of the upper L-shaped connecting slot 21 due to the weight of the secondary wall component 3a and enters the longer leg 22 of the respective slot 21. Thus, the secondary wall component 3a assumes a slightly inclined position relative to the vertical beam 13. Also, the connecting projection 18b slides out of the end zone 35 of the inverted V-shaped connecting slot 29 and has moved slightly longitudinally of the vertical extension slot 36.

Now, when the support structure 1 is further tilted in the direction of the arrow A, from the position of FIG. 4 into the position of FIG. 5, that is through another 90° it may be seen that the upper connecting projection 18 of the secondary wall component 3 is able to move out of the depression 26 and into the depression 25, but that the lower connecting projection 18a was not able to slide into the inverted V-shaped connecting slot 29. Thus, the secondary wall component 3 remains parallel to the vertical beam 13 of the adjacent primary wall 2.

On the other hand, the lower connecting projection 18b of the secondary wall component 3a can move in the longitudinal direction of the vertical extension slot 36 until it reaches the upper end portion thereof and comes to rest thereat. However, it will be appreciated that the upper connecting projection 18c was incapable of leaving the longer leg 22 of the L-shaped connecting slot 21. While it is true that the secondary wall component 3a still assumes a somewhat inclined position relative to the vertical beam 13 of the adjoining primary wall component 2, the secondary wall component 3a remains arrestingly connected to the adjoining primary wall component 2.

The further tilting of the support structure 1 through another 90° from the position illustrated in FIG. 5 into the position illustrated in FIG. 6 in the direction of the arrow A results in a situation where the upper connecting projection 18 of the secondary wall component 3 slides out of the shorter leg 23 or from the depression 25 into the longer leg 22 of the respective upper connecting slot 21 so that the secondary wall component 3 assumes a slightly inclined position relative to the adjoining vertical beam 13. The lower connecting projection 18a has only slightly travelled in the extension slot 36 of the lower connecting slot 29 in the upward direction. However, the upper connecting projection 18 as well as the lower connecting projection 18a still remain within their respective connecting slots 21 or 29 so that the arresting action of the connecting projections 18, 18a is maintained.

It can further be ascertained from FIG. 6 that the connecting projections 18b, 18c of the other secondary wall component 3a retain their position assumed in FIG. 5 even in the position assumed in FIG. 6, due to the gravity action on the wall component 3a.

Now, when the support structure 1 is further tilted in the same direction from the position illustrated in FIG. 6 until it reassumes the position illustrated in FIGS. 1–3, the upper connecting projection 18 of the secondary wall component 3 slides into the depression 26 of the shorter leg 23 of the upper connecting slot 21, and the lower connecting projection 18a slides back into the end zone 35 of the V-shaped connecting slot 29, due to the action of gravity on the secondary wall component 3, as a result of which the secondary wall portion 3 reassumes its parallel position with respect to the adjoining vertical beam 13.

The connecting projections 18b, 18c of the other secondary wall component 3a cannot initially slide along the vertical extension slot 36 or along the vertical longer leg 22 of the respective connecting slots 29 or 21, in the downward direction, in that the upper connecting projection 18c is arrestingly received in the depression 22a. Only when the second surface 33 has passed through its horizontal position during the tilting of the support structure 1 in the direction of the arrow A, can even the connecting projections 18b, 18c slide in the respective connecting slots 29 or 21. In particular, the lower connecting projection 18b can then slide over the second surface 33 into the end zone 35, that is, into the position illustrated in FIG. 3, in that the upper connecting projection 18c leaves the depression 22a under the influence of the gravity on the secondary wall component 3a.

It is to be mentioned that the above-mentioned succession of tilting movements and the consequences thereof is also valid, in the opposite sense, also to the connection between the secondary wall components 3, 3a and the primary wall component 2a.

It will be understood that each of the elements described above, or two or more together, may also find a useful application in other types of support structures differing from the types described above.

While the invention has been illustrated and described as embodied in a connecting arrangement for pallet frames, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected and claimed by Letters Patent is set forth in the appended claims.

1. An arrangement for interconnecting components at adjacent upright marginal portions thereof, particularly wall components to form unitary box-shaped support structures therefrom, comprising, in combination, an upper and a lower connecting projection rigid with one of the respective adjacent marginal portions at the upper and lower regions thereof; and means at the upper and lower regions of the other respective adjacent marginal portion for defining an upper and a lower connecting slot for respectively receiving said connecting projections of said one marginal portion, said upper connecting slot having a substantially L-shaped configuration and including a longer leg which opens onto and extends downwardly from the upper end face of said other marginal portion and a shorter leg which extends from said longer leg toward the side face of said other marginal portion, said lower connecting slot having a substantially inverted V-shaped configuration and including a first leg which opens onto and extends inwardly and upwardly from said side face of said other marginal portion and a second leg which extends inwardly and downwardly from said first leg.

2. An arrangement as defined in claim 1, wherein each of said connecting projections has an enlarged free end portion which engages behind said other marginal portion about the respective connecting slot.

3. An arrangement as defined in claim 1, wherein said shorter leg of said upper slot and said second leg of said lower slot have respective end zones which are located in a substantial vertical alignment with one another.

4. An arrangement as defined in claim 3, wherein said connecting projections are spaced a predetermined distance from one another; and wherein said end zones of said shorter and second legs are also spaced said distance from each other.

5. An arrangement as defined in claim 4, wherein said first leg of said lower slot has an open end at said side face of said other marginal portion; and wherein said open end of said first leg of said lower slot and said end zone of said shorter leg of said upper slot are also spaced said distance from each other.

6. An arrangement as defined in claim 3, wherein said upper and lower slots occupy respective areas of said other marginal portion which have approximately the same vertical dimension.

7. An arrangement as defined in claim 6, wherein said connecting projections have a predetermined diameter each; and wherein said vertical dimension of said area occupied by said lower slot exceeds said vertical dimension of said area occupied by said upper slot by at most one-half of said diameter.

8. An arrangement as defined in claim 3, wherein said means for defining said lower slot further bounds an elongated extension slot which extends upwardly from said end zone of said second leg of said lower slot and has a length which is substantially equal to that of said longer leg of said upper slot.

9. An arrangement as defined in claim 3, wherein said means for defining said lower slot includes first and second surfaces which respectively bound said first and second legs of said lower slot from below; and wherein said first and second surfaces are substantially straight and enclose an angle of substantially 90° with one another.

10. An arrangement as defined in claim 3, wherein said means for defining said lower slot includes a surface which bounds said first and second legs of said lower slot from above and which has an arcuate configuration.

11. An arrangement as defined in claim 3, wherein said connecting projections have a predetermined diameter each; and wherein said shorter leg of said upper slot extends beyond said longer leg of said upper slot to a distance equalling at least one-half of said diameter.

12. An arrangement as defined in claim 11, wherein said distance substantially equals said diameter.

13. An arrangement as defined in claim 3; and wherein said means for defining said upper slot also bounds an upper and a lower depression at said end zone of said shorter leg of said upper slot for receiving said upper connecting projection.

14. An arrangement as defined in claim 13, wherein said upper connecting projection has a predetermined diameter; and wherein said depth of each of said depressions approximately equals one-fourth of said diameter.

15. An arrangement as defined in claim 1, wherein said means for defining said upper slot also bounds a depression which commences at said upper end face of said other marginal portion and extends a limited distance along said longer leg of said upper slot.

16. An arrangement as defined in claim 1, wherein said marginal portions are configurated as rectangular hollow elements of the respective components.

17. An arrangement as defined in claim 1, wherein said marginal portions are configurated as brackets rigid with the respective components.

18. An arrangement as defined in claim 1, wherein said marginal portions includes U-shaped beams and connecting plates rigid with said beams; and wherein said connecting slots are provided in said connecting plates.

* * * * *